(12) United States Patent
Wang et al.

(10) Patent No.: US 11,473,713 B2
(45) Date of Patent: Oct. 18, 2022

(54) TRENCHLESS INTEGRATIVE REPAIR METHOD FOR CONCRETE DRAINAGE PIPELINE WITH CRACKING, CORROSION AND SUBSIDENCE

(71) Applicants: Infrastructure Renewal Institute of Southern China, Guangdong (CN); WELEAD Infrastructure Engineering Technology (Zhengzhou), Ltd., Henan (CN)

(72) Inventors: Fuming Wang, Guangdong (CN); Hongyuan Fang, Guangdong (CN); Peng Zhao, Henan (CN); Yanhui Pan, Henan (CN); Bin Li, Henan (CN); Hang He, Henan (CN)

(73) Assignees: Infrastructure Renewal Institute of Southern China, Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 263 days.

(21) Appl. No.: 16/858,731

(22) Filed: Apr. 27, 2020

(65) Prior Publication Data
US 2020/0256498 A1    Aug. 13, 2020

(30) Foreign Application Priority Data
Sep. 25, 2019 (CN) .......................... 201910911279.1

(51) Int. Cl.
*F16L 55/163* (2006.01)
*F16L 55/165* (2006.01)
(Continued)

(52) U.S. Cl.
CPC ......... *F16L 55/163* (2013.01); *F16L 55/1654* (2013.01); *E03F 2003/065* (2013.01);
(Continued)

(58) Field of Classification Search
CPC . E03F 2003/065; F16L 55/162; F16L 55/163; F16L 55/175
(Continued)

(56) References Cited

U.S. PATENT DOCUMENTS 2,041,266 A * 5/1936 Poulter ................... E01C 23/10
                                                                  404/78
4,035,003 A * 7/1977 James .................... F16L 55/175
                                                                  285/55

(Continued)

*Primary Examiner* — Kenneth Rinehart
*Assistant Examiner* — Richard K. Durden

(57) ABSTRACT

A trenchless integrative repair method includes steps of: S1, pre-casting steel rings according to an internal diameter of a defect pipeline, and forming grouting holes in the steel rings; S2, loading the steel rings to a defect position inside the pipeline, and fitting the steel rings to an internal wall of the pipeline to form reinforcing rings; S3, selecting a number of the grouting holes according to subsidence distribution; drilling a hole in the pipeline to reach a subsidence position and inserting a grouting pipe; steadily grouting the subsidence position with a polymer grouting system, and observing a lift condition of the pipeline; removing the grouting pipe after the pipeline is lifted to a predetermined level; and S4, pulling a lining pipe into the pipeline, and fitting the lining pipe to the steel rings and pipeline walls adjacent to the steel rings; curing the lining pipe.

8 Claims, 5 Drawing Sheets

(51) Int. Cl.
*F16L 55/134* (2006.01)
*F16L 55/1645* (2006.01)
*F16L 9/08* (2006.01)
*E03F 3/06* (2006.01)

(52) U.S. Cl.
CPC .............. *F16L 9/085* (2013.01); *F16L 55/134* (2013.01); *F16L 55/16455* (2013.01)

(58) Field of Classification Search
USPC ........................................... 405/184.1, 184.4
See application file for complete search history.

(56) References Cited

U.S. PATENT DOCUMENTS

| | | | | |
|---|---|---|---|---|
| 4,567,708 | A * | 2/1986 | Haekkinen | E02D 35/00 404/78 |
| 6,468,000 | B2 * | 10/2002 | McNally | E21D 11/155 405/150.1 |
| 7,017,613 | B2 * | 3/2006 | Miura | F16L 55/162 138/155 |
| 7,165,578 | B2 * | 1/2007 | Kamiyama | E03F 3/06 405/151 |
| 7,220,080 | B1 * | 5/2007 | Grimmett | F16L 55/00 138/97 |
| 7,267,739 | B2 * | 9/2007 | Blackmore | F16L 55/265 138/97 |
| 8,360,108 | B2 * | 1/2013 | Kamiyama | F16L 55/163 264/269 |
| 8,418,336 | B2 * | 4/2013 | Bennett | F16L 55/163 29/402.09 |
| 8,985,157 | B2 * | 3/2015 | Kanao | E03F 7/00 264/269 |
| 9,353,888 | B2 * | 5/2016 | Wang | F16L 55/175 |
| 9,777,881 | B2 * | 10/2017 | Wang | F16L 55/175 |
| 10,094,506 | B2 * | 10/2018 | Kartanson | F16L 55/162 |
| 10,408,375 | B2 * | 9/2019 | Trout | F16L 55/18 |
| 10,520,111 | B2 * | 12/2019 | Taylor | F16L 55/18 |
| 2004/0108009 | A1 * | 6/2004 | Kamiyama | E03F 3/06 138/97 |
| 2015/0132064 | A1 * | 5/2015 | Pirtle | B66F 3/35 405/184.4 |
| 2017/0314721 | A1 * | 11/2017 | Okuda | F16L 55/175 |
| 2019/0293225 | A1 * | 9/2019 | Richards, Jr. | F16L 55/1683 |

* cited by examiner

TRENCHLESS INTEGRATIVE REPAIR METHOD FOR CONCRETE DRAINAGE PIPELINE WITH CRACKING, CORROSION AND SUBSIDENCE

CROSS REFERENCE OF RELATED APPLICATION

The present invention claims priority under 35 U.S.C. 119(a-d) to CN 201910911279.1, filed Sep. 25, 2019.

BACKGROUND OF THE PRESENT INVENTION

Field of Invention

The present invention relates to the technical field of pipeline repairing, and more particularly to a trenchless integrative repair method for concrete drainage pipeline with cracking, corrosion and subsidence.

Description of Related Arts

As the "underground artery" of modern cities, the urban underground pipeline networks bear the responsibilities of sewage and drainage and they play an important role in the daily lives of urban residents. With the acceleration of China's urbanization process, the construction scale of the urban underground pipeline networks increases. By 2016, the total length of China's water supply, gas, drainage, and heat pipelines had exceeded 2.12 million kilometers. With the service life continuous to increase, the pipelines will gradually aging and out of repair, and thus suffer with the coexisted engineering defects of cracking, corrosion and subsidence. If these defects cannot be timely cured, they will cause the ground to crack and collapse and environmental pollution, which will seriously threaten residents' travel and safety of nearby constructions. Therefore, repairing the subsidence of underground pipelines and restoring the functions thereof play an important role in ensuring the normal life as well as the safety of life and property of people along the pipelines.

There are two repairing methods for pipeline disconnection. The first is the excavation repairing method, with which the pipeline defects can be cured completely. however, the excavation repairing method is time-consuming and costly, and affects the normal operation of the city traffic, and it produces large amounts of construction waste is generated and pollutes the environment. The second is the trenchless repairing method, of which the construction technologies include the pipeline penetration method, cured-in-place pipe (CIPP) method, pipe crushing method, winding method, grouting method. Compared with the conventional excavation repairing method, the trenchless repairing method is time-saving and environmental-friendly. However, the construction technologies including the pipeline penetration method, the cured-in-place pipe (CIPP) method, the pipe crushing method and the winding method can only repair the damage to the pipeline structure itself, and they are helpless for repairing the external damage to the pipelines. Although the polymer grouting method can repair external damages including subsidence and incompactness, it cannot restore the strength of the pipelines themselves. If the pipelines suffer with structural defects including cracking, corrosion, and subsidence, directly lifting the subsidence pipeline may cause the pipelines to break structure, which threatens the safety of the construction.

Some of the existing repairing methods are usually the direct grouting repairing on the defect sites. the grouting quality is extremely difficult to control and it is very likely that the expansion force will be too great, which may break the pipes, so that the pipelines cannot be effectively repaired. Furthermore, the conventional repairing methods can usually repair only one kind of defect. Therefore, there is an urgent need to develop a trenchless integrative repairing method for curing the damages to both the external and wall structures of the underground concrete drainage pipelines.

Chinese patent application CN201510433548.X discloses a trenchless repairing method for the deformation and collapse of drainage pipes in weak formations. The trenchless repair is performed for the deformation and collapse of large-diameter plastic drainage pipes, and it includes the grouting reinforcement, cutting, curved steel plate installation and lining construction of cured-in-place pipe for collapsed portions. The repairing method disclosed in that patent was developed for the completely collapsed pipes, wherein the top part of the pipes is grouted and then reinforced, which is different from the repairing method of the present invention for subsided and corroded pipes.

SUMMARY OF THE PRESENT INVENTION

The object of the present invention is to provide a trenchless integrative repairing method for concrete drainage pipelines with various defects, so as to solve the problem that the defects cannot be effectively repaired because the pipes may burst during grouting when the conventional pipeline repair method is used.

Accordingly, in order to accomplish the above objects, the present invention provides a trenchless integrative repairing method for concrete drainage pipelines with various engineering defects, wherein the defects comprise cracking, corrosion and subsidence; the trenchless integrative repairing method comprises the following steps of:

S1, prefabricating steel rings according to an internal diameter of defect pipelines, and forming grouting holes in the steel rings;

S2, inserting the steel rings into pipelines at defect locations, and positioning the steel rings close to an internal wall of the pipelines to form reinforcing rings;

S3, selecting a number of the grouting holes according to distribution of subsidence defect; drilling holes in the pipeline to a subsidence position and inserting a grouting pipe; steadily grouting the subsidence position with a polymer grouting system, and observing lifting of the pipeline; removing the grouting pipe after the pipeline is lifted to a predetermined level; and S4, pulling a lining pipe into the pipeline, and positioning the lining pipe close to the steel rings and pipeline walls adjacent to the steel rings; solidifying the lining pipe to close to the pipeline walls and wrap the steel rings.

Preferably, in the step S1, each of the steel rings is formed by four quarter-arc-shaped steel blocks, and at least one grouting hole is formed in a center of each of the steel blocks.

Preferably, the step S2 also comprises placing an airbag into an outlet of an upstream pipe from an inspection well before inserting the steel rings into the pipeline; inflating the airbag with an air compressor and an inflation valve to block upstream water flow, so that workers enter from the inspection well and reach the subsidence position.

Preferably, in the step S2, the inserted steel rings are assembled together end to end along an axis direction of the pipe, and a total length of the assembled steel rings is determined according to actual distribution of the defects on-site.

Preferably, in the step S2, at least one of the formed grouting holes is positioned to near a bottom of the pipeline when inserting the steel rings.

Preferably, each of the steel rings is provided with screw connection holes in advance, and adjacent steel rings are assembled and connected through fixing screws, connection gaskets and the screw connection holes.

Preferably, the fixing screws of the adjacent steel rings are not fully fastened in the step S2, and the fixing screws are fully fastened after finishing the step S3.

Preferably, in the step S4, the lining pipe is pulled into the pipeline from an upstream inspection well, and pulled out of the pipeline from a downstream inspection well; the lining pipe is inflated by an air compressor to close the pipeline walls and the steel rings.

Preferably, in the step S4, by using a pulley block fixed to a well wall and a traction wire installed on the pulley block, an ultraviolet lamp is moved inside the lining pipe for solidifying the lining pipe, with which the lining pipe is close to the internal wall of the pipeline and wrap the steel rings.

Preferably, the trenchless integrative repairing method further comprises a step S5: cutting away an excess portion of the lining pipe, removing the airbag, and recovering rest repair equipment.

Compared with the prior art, the beneficial effects of the present invention are as follows.

First, the trenchless integrative repairing method according to the present invention reinforces the cracked and corroded parts inside the pipeline, then lifting the pipeline through grouting to repair the subsidence defect. After lifting, the CIPP method is used to reinforce and repair the cracked and corroded parts of the pipeline through the lining pipe, with which various defects including subsidence, cracking, and corrosion of pipelines can be simultaneously repaired and the overall repair thereof can be ultimately achieved. The method proposed in this invention is with fast construction speed and low cost, and it brings less disruption to traffic. The present invention has a broad promotion effect on the trenchless repair technology for the subsidence and corrosion of municipal concrete pipelines in China.

Second, since the steel rings are used to support the pipeline, the slurry can slowly lift the subsided pipeline to a normal level based on the supporting of the steel rings during grouting. Furthermore, grouting is performed through the preset grouting holes on the steel rings, with which the problem that the grouting quantity is difficult to control during the conventional polymer grouting repairing of the subsidence of concrete pipeline can be effectively overcome. The conventional polymer grouting repairing method is more likely to result in the excessive expansion force that can burst the pipeline, and it is helpless for repairing the corrosion defect of pipelines after the lifting treatment. Using the repairing method presented here, the secondary damage cause by the conventional direct grouting method to the pipelines can be avoided.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely some embodiments of the present invention. For those of ordinary skill in the art, other drawings can be obtained based on the structure shown in the drawings without creative labor.

ELEMENT REFERENCE

Figure 1:
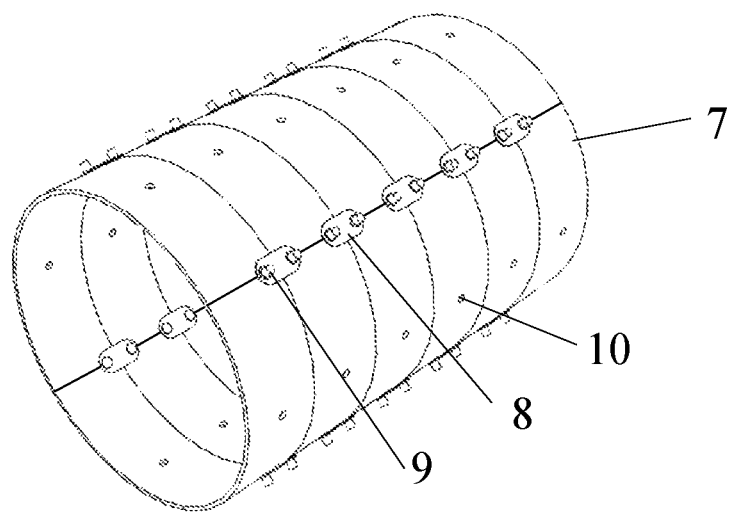
FIG. 1 is a structural view of the assembled steel rings according to an embodiment of the present invention.
Figure 2:
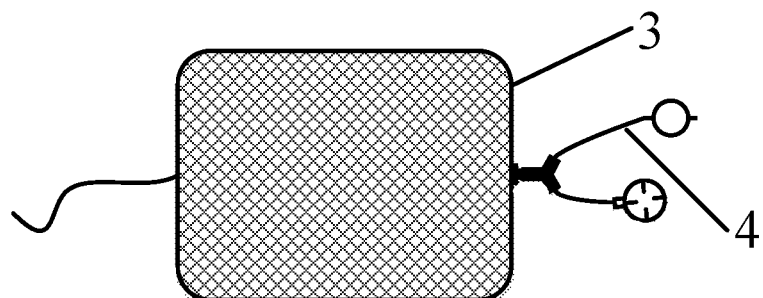
FIG. 2 is a structural view of the airbag according to the embodiment of the present invention.
Figure 3:
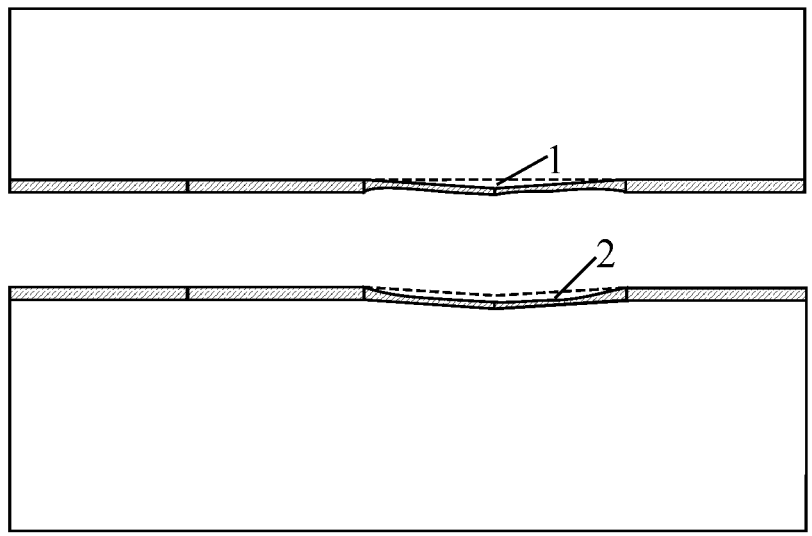
FIG. 3 is a sectional view of a concrete pipeline suffering with the corrosion and subsidence defects according to the embodiment of the present invention.
Figure 4:
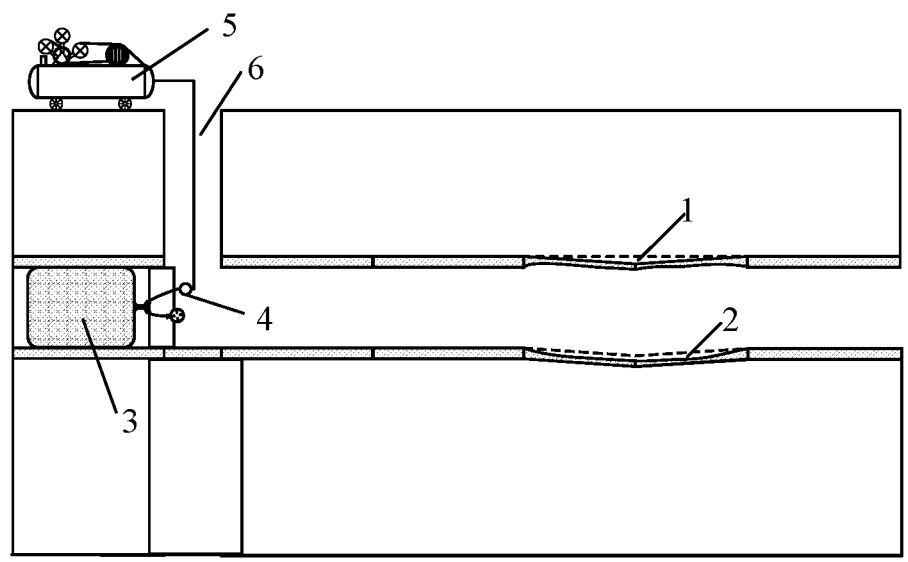
FIG. 4 illustrates the water interception inside the pipeline by the airbag according to the embodiment of the present invention.

1—subsidence, 2—corrosion, 3—airbag, 4—inflation valve, 5—air compressor, 6—inspection well, 7—steel ring, 8—connection gasket, 9—fixing screw, 10—grouting hole, 11—polymer grouting system, 12—grouting pipe, 13—lining pipe, 14—pulley block, 15—ultravioilet lamp, 16—traction wire.

DETAILED DESCRIPTION OF THE PREFERRED EMBODIMENT

Technical solutions according to the embodiments of the present invention will be clearly and fully described below with reference to the accompanying drawings. Obviously, the described embodiments are not all, but only some of the embodiments of the present invention. Based on the embodiments of the present invention, all other embodiments can be obtained by those of ordinary skill in the art without creative efforts. Such other embodiments shall fall within the protection scope of the present invention.

It should be noted that all directional indications (such as up, down, left, right, front, back, . . . ) in the embodiments of the present invention are only used to explain the relative positional relationship, motion situation and the like of components in a certain posture (as shown in the drawings). If the specific posture changes, the directional indication also changes accordingly.

In addition, the descriptions of "first", "second", and the like in the present invention are used for the purpose of description only, and are not to be construed as indicating or implying their relative importance or implicitly indicating the number of technical features. Thus, features defined with "first" or "second" may include at least one of the features, either explicitly or implicitly. Therefore, the features defined as "first" and "second" may explicitly or implicitly include at least one of the features. In the description of the present invention, the meaning of "multiple" is at least two, for example, two, three, etc., unless it is specifically defined otherwise.

In the present invention, the terms "connected", "fixed" and the like shall be understood in a broad sense unless otherwise specified and defined. For example, "fixed" may be a fixed connection, a detachable connection, or an integral body. It can be a mechanical connection or an electrical connection. It can be directly connected or indirectly connected through an intermediate medium. It can be the internal connection of two elements or the interaction between two elements, unless it is clearly defined otherwise. For those of ordinary skill in the art, the specific meanings of the above terms in the present invention can be understood according to specific situations.

In addition, the technical solutions according to the embodiments of the present invention can be combined with each other. the combination must be based on those that can be implemented by persons skilled in the art. When the combination of technical solutions conflicts or cannot be achieved, such a combination of technical solutions should be considered that it does not exist and is not within the scope of protection claimed by the present invention.

Referring to FIG. 1-11, the present invention provides a trenchless integrative repairing method for a concrete drainage pipeline with various defects, wherein the defects comprise subsidence 1, corrosion 2, and cracking; the trenchless integrative repairing method comprises the following steps:

S1, prefabricating the steel rings 7 according to the internal diameter of a defect pipeline, and grouting holes 10 are formed in the steel rings 7;

S2, inserting the steel rings 7 into the pipeline at the defect locations, and positioning the steel rings 7 close to the internal wall of the pipeline to form the reinforcing rings;

S3, selecting an appropriate number of grouting holes 10 according to the distribution of subsidence defect; drilling a hole in the pipeline to the subsidence position and inserting a grouting pipe 12; steadily grouting the subsidence position with a polymer grouting system 11, and observing the lifting of the pipeline; removing the grouting pipe 12 after the pipeline is lifted to a predetermined level; and S4, pulling a lining pipe 13 into the pipeline, and positioning the lining pipe 13 close to the steel rings 7 and pipeline walls adjacent to the steel rings 7; solidifying the lining pipe 13 to close to the pipeline walls and wrap the steel rings 7.

First, various engineering defects can occur in the buried pipelines in service all year around, and they include the subsidence, corrosion and cracking. Corrosion is caused by the chemical reaction between the acidic liquid and the internal wall of the concrete pipelines; subsidence is mainly because that the dislocation of the pipe joints or loss of foundation supporting materials caused by the fluid leakage at the cracks of the pipelines can result in the void, thus the subsidence occurs under the action of the upper load. The subsidence will furtherly cause the pipe body to locally bend and crack. the severe corrosion will thin the wall of pipelines, which will accelerate the formation of cracks. Cracks are prone to appear in the subsidence due to local bending, and corrosion usually occurs throughout the body of most pipelines. The subsidence defect of a pipeline is often accompanied by defects of cracking and corrosion. However, most of the conventional methods can repair only one kind of defects.

In this embodiment, the steel rings reinforcement is first used to overall support and stabilize the defect pipeline, then the pipeline is lifted by grouting through preset grouting holes on the steel rings, with which the subsidence hazard can be effectively overcome. Then CIPP method is used to reinforce and repair the corroded and cracked parts of the pipeline through the lining pipe, with which various defects including subsidence, cracking, and corrosion of pipelines can be simultaneously repaired.

Second, the conventional grouting repairing is usually performed by drilling and grouting directly at the defect position of the pipelines, and polymer materials are usually used as grouting materials. However, it is difficult to control amount of grouting material. The polymer materials will expand and solidified very soon after reaction, accompanied with which the expansion force forms. Therefore, if it is not done properly, the expansion force will result in the secondary damage to the pipes, especially to the concrete pipelines that are brittle materials and are more prone to secondary damage than plastic pipelines when drilling and grouting.

The present invention adopts the method of steel rings reinforcement first and grouting later. The grouting holes are drilled in the steel rings in advance to avoid the damage to the pipeline caused by the subsequent additional drilling. The steel rings provide the overall reinforcement to the defect pipelines, with which the further deterioration of the defect caused by the drilling vibration when drilling holes can be avoided. Based on the supporting of the steel rings, the polymer material is injected through the inner side of the pipeline to lift the pipeline in a steady way. At the same time, the polymer is restrained by the steel rings during lifting, and it will be lifted to an ideal level with the steel rings, so that the present invention effectively solves the problem that drilling and grouting in the conventional technology is more easily to lead to the secondary damage.

Figure 5:
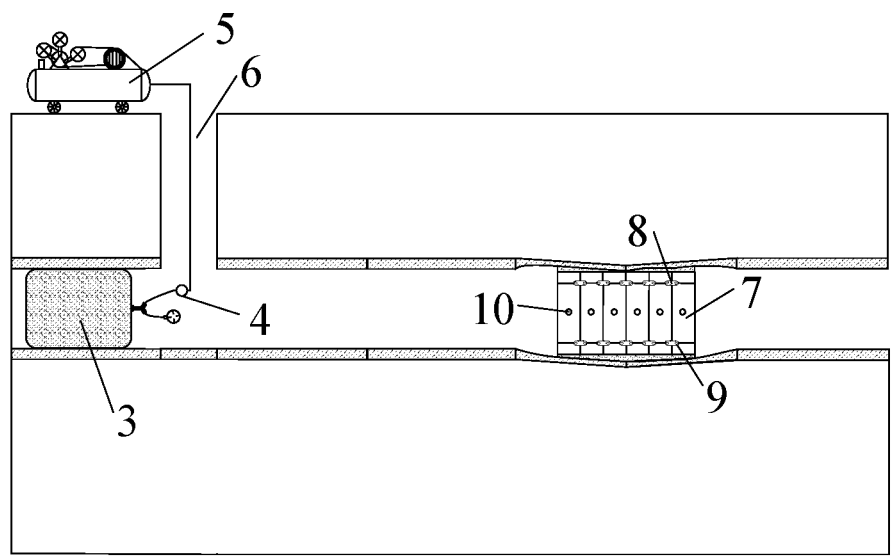
FIG. 5 illustrates pipeline reinforcement by inserting the steel rings into the pipeline according to the embodiment of the present invention.
Figure 6:
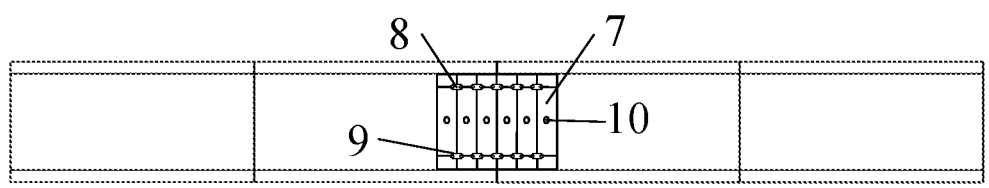
FIG. 6 is a plan layout of grouting holes in the steel ring according to the embodiment of the present invention.
Figure 7:
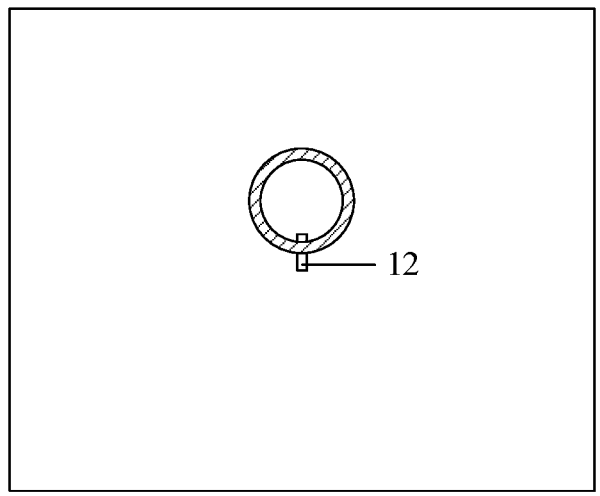
FIG. 7 is a cross-sectional view illustrating the arrangement of the grouting holes and a grouting pipe according to the embodiment of the present invention.
Figure 8:
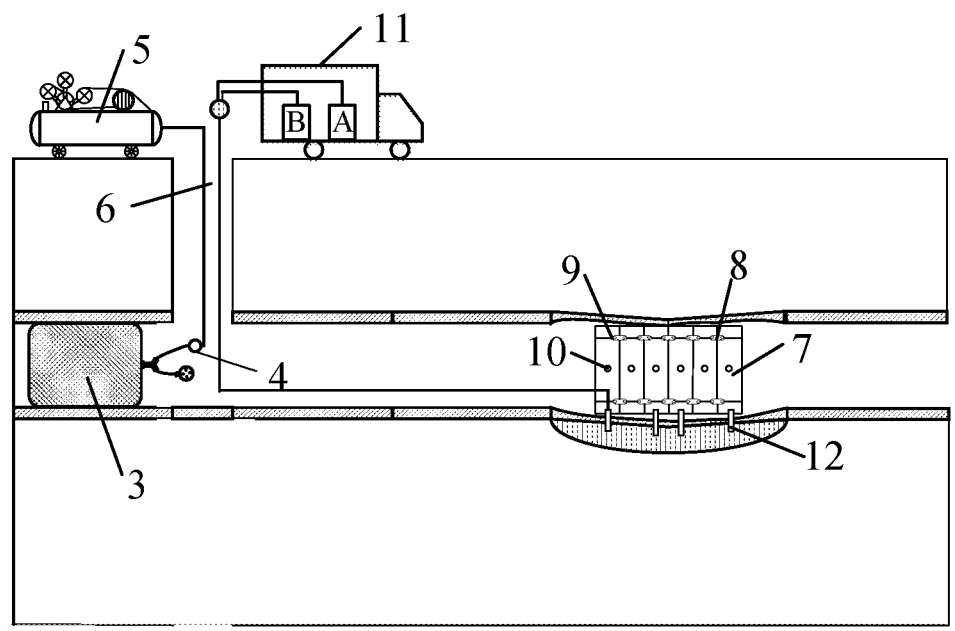
FIG. 8 illustrates lifting the pipeline by polymer grouting according to the embodiment of the present invention.
Figure 9:
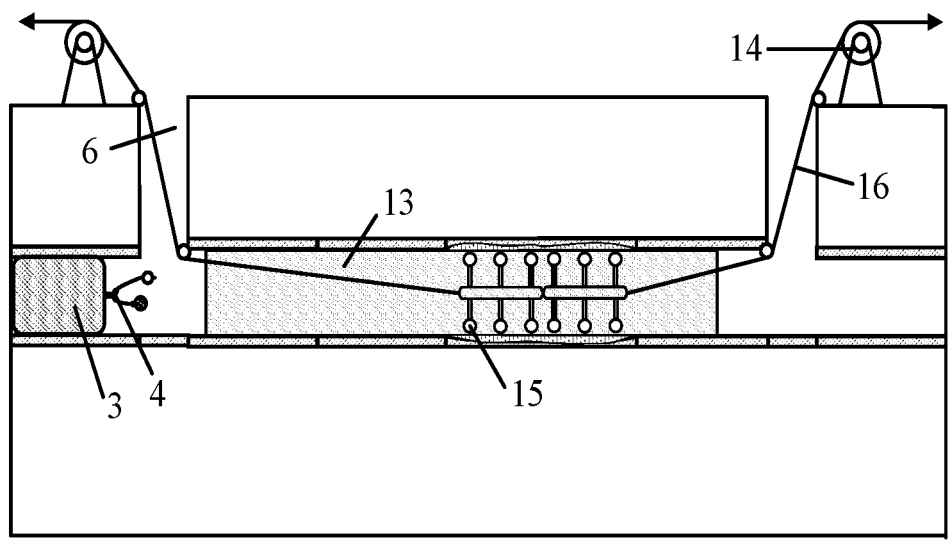
FIG. 9 is a sketch view of cured-in-place pipe (CIPP) photo-curing repair according to the embodiment of the present invention.
Figure 10:
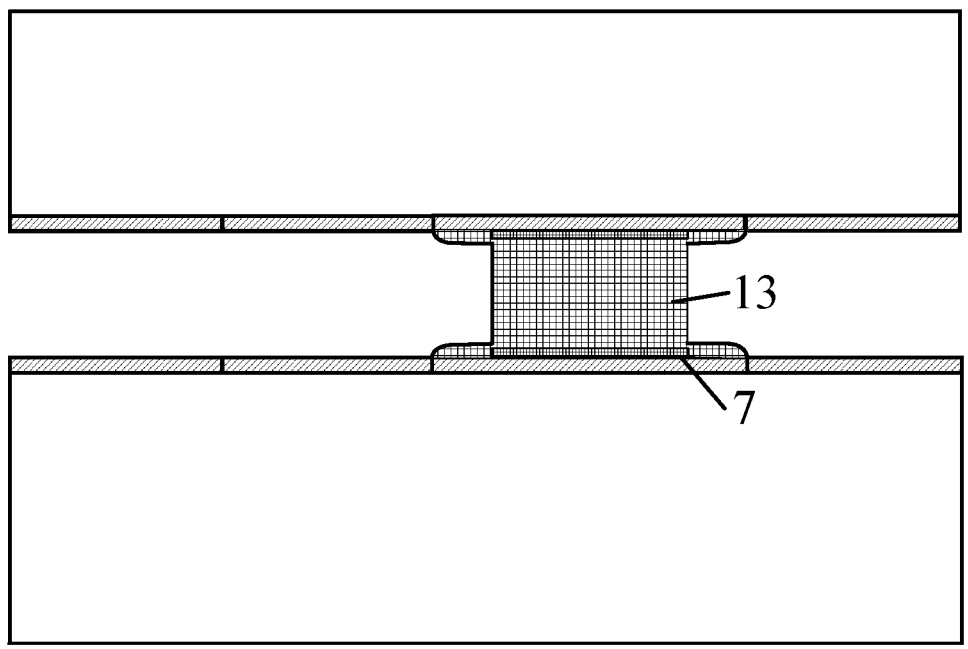
FIG. 10 is a sectional view of the cured-in-place pipe (CIPP) photo-curing repair according to the embodiment of the present invention.
Figure 11:
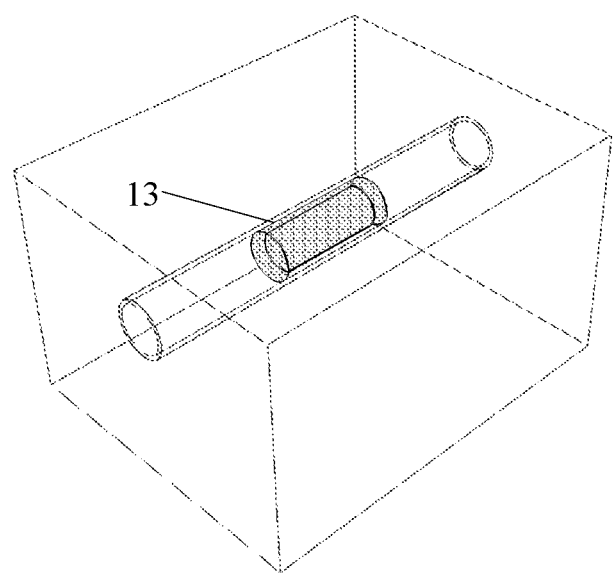
FIG. 11 is a perspective view of the cured-in-place pipe (CIPP) photo-curing repair according to the embodiment of the present invention.

Preferably, referring to FIGS. 1, 5 and 6, the inserted steel rings 7 are assembled together. Each of the steel rings 7 is formed by four quarter-arc-shaped steel blocks, and at least one grouting hole 10 is formed in the center of the steel blocks. Each of the steel rings 7 is provided with screw connection holes in advance, and the steel rings 7 are connected together end to end along the axis direction of the pipeline through the fixing screws 9 and connection gaskets 8. In addition, when inserting the steel rings 7, the grouting holes 10 in the steel rings 7 should be as close to the subsidence position as possible. Since the subsidence position is mostly located at the bottom of the pipeline, at least one set of the grouting holes 10 is placed at a pipeline bottom when assembling and inserting the steel rings 7. When multiple steel rings 7 are assembled into a whole, the entire steel ring structure is provided with enough grouting holes 10 in the axial directions for the subsequent grouting operations. If the formed grouting holes 10 cannot meet the grouting requirements, additional holes can be drilled at any appropriate positions.

Preferably, the fixing screws 9 of the adjacent steel rings 7 are not fully fastened in the step S2. When the defect pipeline and steel rings are lifted, the fixing screws 9 are not fully fastened, so that the connection between the steel rings 7 can move and that the steel rings 7 can deform in coordination with the pipeline, which can prevent the pipelines to crack furtherly.

Preferably, the step S2 further comprises placing an airbag 3 into the outlet of the upstream pipe from an inspection well 6 before inserting the steel rings into the pipeline; inflating the airbag 7 with an air compressor 5 and an inflation valve 4 to block upstream water flow, so that workers can enter from the inspection well 6 and reach the subsidence position. The airbag 3 is easy to be inflated and detached.

Preferably, in the step S4, the lining pipe 13 is pulled into the pipeline from the upstream inspection well, and pulled out of the pipeline from the downstream inspection well; the lining pipe 13 is inflated by an air compressor 5 to close the pipeline walls and the steel rings 7. by using the pulley block 14 fixed to the well wall and the traction wire installed on the pulley block, making an ultraviolet lamp 15 move inside the lining pipe for solidifying the lining pipe 13, with which the lining pipe can close to the internal wall of the pipeline and wrap the steel rings. In addition, the solidifying length beside the steel ring structure should be shortened as much as possible under the premise of completely wrapping the steel rings 7, so as to save the repair cost.

Preferably, after the step S4, the trenchless integrative repair method further comprises a step S5: cutting away an excess portion of the lining pipe 13, removing the airbag 3, and recovering the rest of the repair equipment.

According to the present invention, the trenchless integrative repair method for the concrete drainage pipeline suffering the various defects comprises specific steps of:

1, prefabricating the steel rings 7 according to the internal diameter of the defect pipelines, and each of the steel ring 7 is made up of four quarter-arc-shaped steel blocks with a width of 20 cm; drilling grouting holes with a diameter of 16 mm at the top and two sides of each steel ring 7 in advance, and drilling the screw connection holes at assembling positions of the steel rings 7 in advance;

2, placing an airbag 3 into an upstream pipe outlet from an inspection well, wherein an external diameter of the airbag 3 is 5 cm larger than an internal diameter of the pipeline; inflating the airbag 3 with an air compressor 5 and an inflation valve 4 to block upstream water flow, so that workers can enter from the inspection well and reach the subsidence position; assembling the steel rings 7 with the screw connection holes, fixing screws 9 and connection gaskets 8 according to subsidence conditions, and positioning the steel rings 7 to close to the internal wall of the pipeline to form reinforcing rings, wherein an assembling length of the steel rings 7 is determined according to actual conditions on-site;

3, selecting an appropriate number of grouting holes 10 according to subsidence conditions; drilling a hole to the subsidence position and inserting a grouting pipe 12; steadily grouting the subsidence position with a polymer grouting system 11, and observing the lifting of the pipeline; removing grouting equipment after the pipeline is lifted to a predetermined level;

4, pulling a lining pipe 13 into the pipeline from an upstream inspection well, and pulling out of the pipeline from a downstream inspection well; inflating the lining pipe 13 by an air compressor 5 to close to the pipeline walls and steel ring structures; by using the pulley block 14 fixed to the well wall and the traction wire 16 installed on the pulley block, making an ultraviolet lamp 15 move inside the lining pipe for solidifying the lining pipe, with which the lining pipe can close to the internal wall of the pipeline and wrap the steel rings; and 5, cutting away an excess portion of the lining pipe 13, removing the airbag 3, and recovering the rest of the repair equipment.

The above is only preferred embodiments of the present invention, and therefore does not limit the claimed scope of the present invention. Any equivalent structural transformation or direct/indirect application to other related technical fields based on the description and drawings of the present invention is with the protection scope of the present invention.

What is claimed is:

1. A trenchless integrative repair method for concrete drainage pipelines with various defects, wherein the defects comprise subsidence; the trenchless integrative repair method comprises steps of:
    S1, prefabricating steel rings according to an internal diameter of a defective pipeline, and forming grouting holes in the steel rings;
    S2, inserting the steel rings into the defective pipeline, and positioning the steel rings against an internal wall of the defective pipeline to form reinforcing rings;
    S3, drilling holes in the defective pipeline to a subsidence position, so as to cooperate with the grouting holes; and inserting a grouting pipe; grouting the subsidence position with a polymer grouting system, and observing lifting of the defective pipeline; removing the grouting pipe after the defective pipeline is lifted to a predetermined level; and
    S4, pulling a lining pipe into the defective pipeline, and positioning the lining pipe within the steel rings and extending to a portion of the internal wall of the defective pipeline adjacent to the steel rings; solidifying the lining pipe to wrap the steel rings.

2. The trenchless integrative repair method, as recited in claim 1, wherein the step S2 also comprises placing an airbag into an outlet of an upstream pipe from an inspection well before inserting the steel rings into the defective pipeline; inflating the airbag with an air compressor and an inflation valve to block upstream water flow to permit workers to enter from the inspection well and reach the subsidence position.

3. The trenchless integrative repair method, as recited in claim 2, further comprising a step S5: cutting away an excess portion of the lining pipe, removing the airbag, and recovering any remaining repair equipment.

4. The trenchless integrative repair method, as recited in claim 1, wherein in the step S2, the inserted steel rings are assembled together end to end along an axis direction of the defective pipeline, and a total length of the assembled steel rings is determined according to actual distribution of the defects on-site.

5. The trenchless integrative repair method, as recited in claim 4, wherein in the step S2, at least one of the formed grouting holes is positioned toward a bottom of the defective pipeline when inserting the steel rings.

6. The trenchless integrative repair method, as recited in claim 5, wherein each of the steel rings is provided with screw connection holes in advance, and adjacent steel rings are assembled and connected through fixing screws, connection gaskets and the screw connection holes.

7. The trenchless integrative repair method, as recited in claim 6, wherein the fixing screws of the adjacent steel rings are not fully fastened in the step S2, and the fixing screws are fully fastened after finishing the step S3.

8. The trenchless integrative repair method, as recited in claim 1, wherein in the step S4, by using a pulley block fixed to a well wall and a traction wire installed on the pulley block, an ultraviolet lamp is moved inside the lining pipe for solidifying the lining pipe.

* * * * *